United States Patent
Amemiya

(10) Patent No.: US 11,112,511 B2
(45) Date of Patent: Sep. 7, 2021

(54) RADIATION DETECTOR AND COMPTON CAMERA

(71) Applicant: CANON KABUSHIKI KAISHA, Tokyo (JP)

(72) Inventor: Mitsuaki Amemiya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/514,285

(22) Filed: Jul. 17, 2019

(65) Prior Publication Data

US 2020/0033487 A1  Jan. 30, 2020

(30) Foreign Application Priority Data

Jul. 24, 2018  (JP) .............................. JP2018-138768

(51) Int. Cl.
*G01T 1/24* (2006.01)
*G01T 1/29* (2006.01)
*G01T 1/20* (2006.01)

(52) U.S. Cl.
CPC .............. *G01T 1/241* (2013.01); *G01T 1/20* (2013.01); *G01T 1/247* (2013.01); *G01T 1/2928* (2013.01)

(58) Field of Classification Search
CPC ......... G01T 1/241; G01T 1/2928; G01T 1/20; G01T 1/247; G01T 1/17
USPC .................................................... 250/370.09
See application file for complete search history.

(56) References Cited

U.S. PATENT DOCUMENTS

| 4,641,165 A | * | 2/1987 | Iizuka | ............... H01L 27/10805 |
| | | | | 257/297 |
| 5,138,415 A | * | 8/1992 | Yano | .................... H01L 31/1113 |
| | | | | 257/113 |
| 7,459,688 B2 | | 12/2008 | Aoki | |
| 2014/0284488 A1 | | 9/2014 | Sanuki | |
| 2016/0326927 A1 | * | 11/2016 | Kato | .................... F02D 41/1475 |
| 2017/0146480 A1 | * | 5/2017 | Matsuda | ............ G01N 27/4072 |
| 2018/0180747 A1 | | 6/2018 | Matsuura | |

FOREIGN PATENT DOCUMENTS

| JP | 08-148712 A | 6/1996 |
| JP | 2000-111651 A | 4/2000 |
| JP | 2014-185852 A | 10/2014 |
| JP | 2017-026524 A | 2/2017 |

* cited by examiner

*Primary Examiner* — David P Porta
*Assistant Examiner* — Gisselle M Gutierrez
(74) *Attorney, Agent, or Firm* — Canon U.S.A., Inc. IP Division

(57) ABSTRACT

The present disclosure concerns a charge-accumulation radiation detector that includes a semiconductor device and specifies an incident time and energy of radiation from a transferred image signal. The radiation detector includes a semiconductor substrate and electrodes disposed on both sides of the semiconductor substrate, and includes a plurality of charge accumulation units inside the semiconductor substrate. The plurality of charge accumulation units is each configured to accumulate charges generated by radiation incident on the semiconductor substrate. The charges accumulated in the charge accumulation units are readable to outside through at least one of the electrodes.

11 Claims, 7 Drawing Sheets

RADIATION DETECTOR AND COMPTON CAMERA

BACKGROUND

Field of the Disclosure

The present disclosure relates to a radiation detector that detects radiation as an observation target by detecting photoelectrons generated by a photoelectric effect and recoil electrons generated by Compton scattering, and to a Compton camera.

Description of the Related Art

Radiation detection apparatuses using a semiconductor device have been available. Japanese Patent Application Laid-Open No. 2014-185852 discusses a radiation detection apparatus including first and second detection units. The first detection unit detects a position at which a first interaction occurs due to incident radiation and a track of a recoil electron generated by the first interaction, with use of a first photoelectric conversion device. The second detection unit detects a position at which a second interaction occurs due to scattered radiation. A position of a radiation source in an observation target space is calculated with use of the positions at which the first and second interactions occur and the track of the recoil electron.

Japanese Patent Application Laid-Open No. 2017-026524 discusses a radiation measurement apparatus including a scatter detector, an absorber detector, and a processing unit. Pixel electrodes of the scatter detector and the absorber detector are arranged such that a distance between centers of two adjacent pixel electrodes is smaller than a mean free path of a recoil electron generated by Compton scattering with electromagnetic radiation.

In a charge-accumulation two-dimensional semiconductor device, charges generated by the recoil electrons are accumulated in a capacitor inside a detector, and the charges are transferred outside as image signals. However, the time when the transferred charges are accumulated cannot be specified, so that a reading time period of the image signals becomes a dead time period and an incident time from a radiation source cannot be specified. In a non-charge-accumulation two-dimensional semiconductor device, a signal line is disposed for respective pixel electrodes arranged in a matrix, which allows for specification of the accumulation time of the transferred charges; however, in order to improve accuracy of position measurement, the pixel electrodes are miniaturized and the number of signal lines is increased.

Thus, the existing radiation detector using the charge-accumulation two-dimensional semiconductor device cannot specify the incident time and energy of the radiation from the transferred image signals.

SUMMARY

Some embodiments comprise a radiation detector that includes a charge-accumulation two-dimensional semiconductor device and that can specify an incident time and energy of radiation after transfer of an image signal, and a Compton camera including the radiation detector.

According to an aspect of some embodiments, a radiation detector includes a semiconductor substrate and electrodes disposed on both sides of the semiconductor substrate, and includes a plurality of charge accumulation units inside the semiconductor substrate. The plurality of charge accumulation units is each configured to accumulate charges generated by radiation incident on the semiconductor substrate. The charges accumulated in the charge accumulation units are readable to outside through at least one of the electrodes.

Further features of various embodiments will become apparent from the following description of exemplary embodiments with reference to the attached drawings.

DESCRIPTION OF THE EMBODIMENTS

While an X-ray is used as an example of radiation in exemplary embodiments, some embodiments are applicable to a gamma ray.

Figure 1:
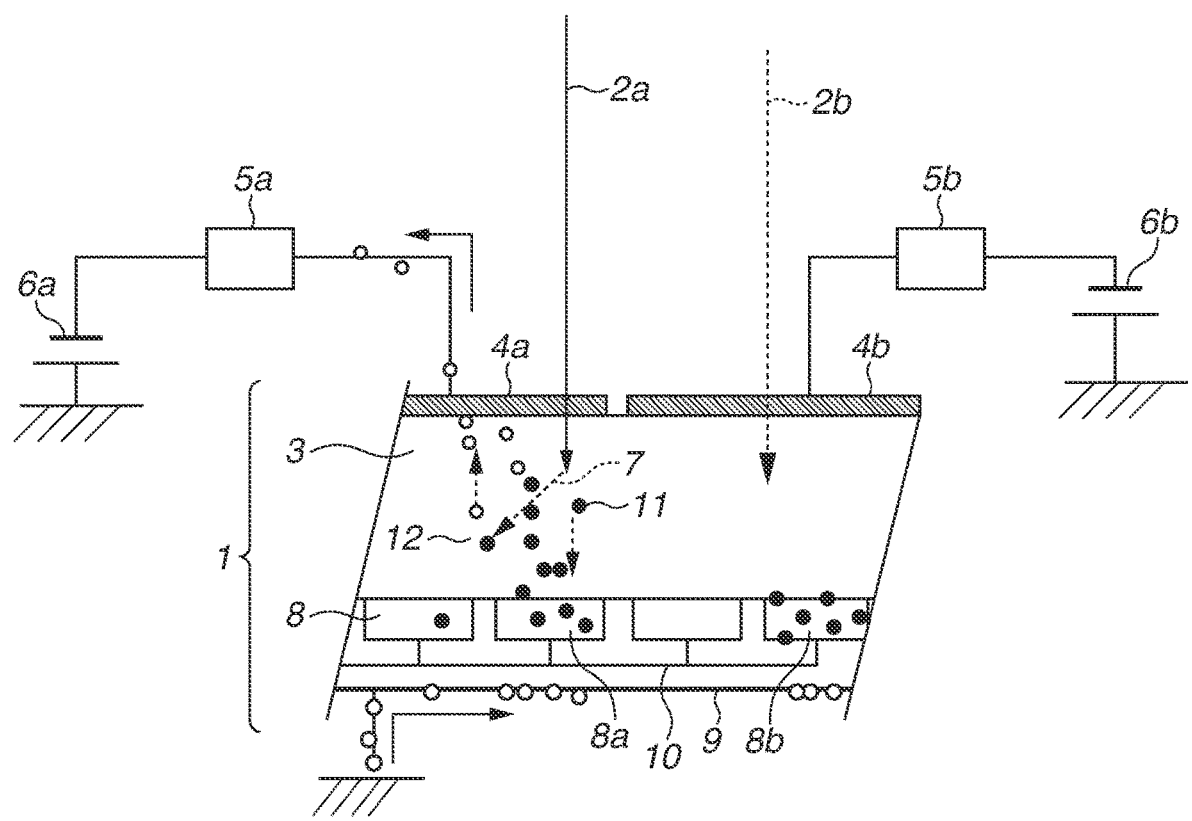
FIG. 1 is a schematic diagram illustrating a configuration of an X-ray detector according to a first exemplary embodiment.

A first exemplary embodiment will be described below. Referring to FIG. 1, which is a partial sectional view of an X-ray detector 1 according to an embodiment, the X-ray detector 1 includes a semiconductor substrate 3 that is a layer that is sensitive to an X-ray, as illustrated by X-rays 2 (2$a$ and 2$b$) in FIG. 1, and front-surface electrodes 4$a$ and 4$b$ (both may collectively referred to as front-surface electrode 4) and a back-surface electrode 9 formed on front and back surfaces of the semiconductor substrate 3, respectively. The plurality of front-surface electrodes 4$a$ and 4$b$ is provided on the surface of the semiconductor substrate 3 on which an X-ray is incident (radiation incident side). The X-ray detector 1 is a two-dimensional semiconductor device using a silicon (Si) substrate, such as a complementary metal-oxide semiconductor (CMOS) and a charge coupled device (CCD). The front-surface electrodes 4$a$ and 4$b$ are grounded through ammeters 5$a$ and 5$b$ (both may collectively referred to as ammeter 5) and voltage sources 6$a$ and 6$b$ (both may collectively referred to as voltage source 5), respectively. The voltage sources 6$a$ and 6$b$ may be commonized. When the X-ray 2$a$ is incident on the semiconductor substrate 3 and is photoelectrically absorbed by the semiconductor substrate 3, photoelectrons 7 of the number corresponding to energy of the X-ray are generated by a photoelectric effect. The photoelectrons 7 move inside the semiconductor substrate 3 while generating electrons 11 and electron holes 12, lose energy, and then stop. The number of generated electrons 11 and the number of generated electron holes 12 are each proportional to the energy of the photoelectrons 7. Thus, if the number of electrons or the number of electron holes is known, the energy of the incident X-ray can be determined. An electric field is formed in the semiconductor substrate 3 through the voltage source 6. Thus, the electron holes 12 move to the surface on which the X-ray 2a is incident and flow to the ground through the ammeter 5a, and a time Ta and a current Ia detected by the ammeter 5a are recorded. On the other hand, the electrons 11 move to the surface opposite to the surface on which the X-ray 2a is incident, and are accumulated in capacitors (charge accumulation units) 8 that are arranged in a matrix. The back-surface electrode 9 is provided on the surface opposite to the incident surface for the X-ray 2 (side opposite to radiation incident side), and is grounded. The same number of electron holes as that of electrons accumulated in the capacitors 8 is supplied from the ground to the back-surface electrode 9. The number of electrons accumulated in the capacitors 8 is equal to the number of electron holes flowing to the front-surface electrode 4a. Thus, the number of electrons accumulated in the capacitors 8 is measured from an amount of the current Ia. The X-ray 2b is incident on the semiconductor substrate 3 before the X-ray 2a is incident on the semiconductor substrate 3 and the electrons are accumulated in a capacitor 8b, and an incident time Tb and a current Ib of the X-ray 2b are recorded by the ammeter 5b as with the X-ray 2a.

Figure 2:
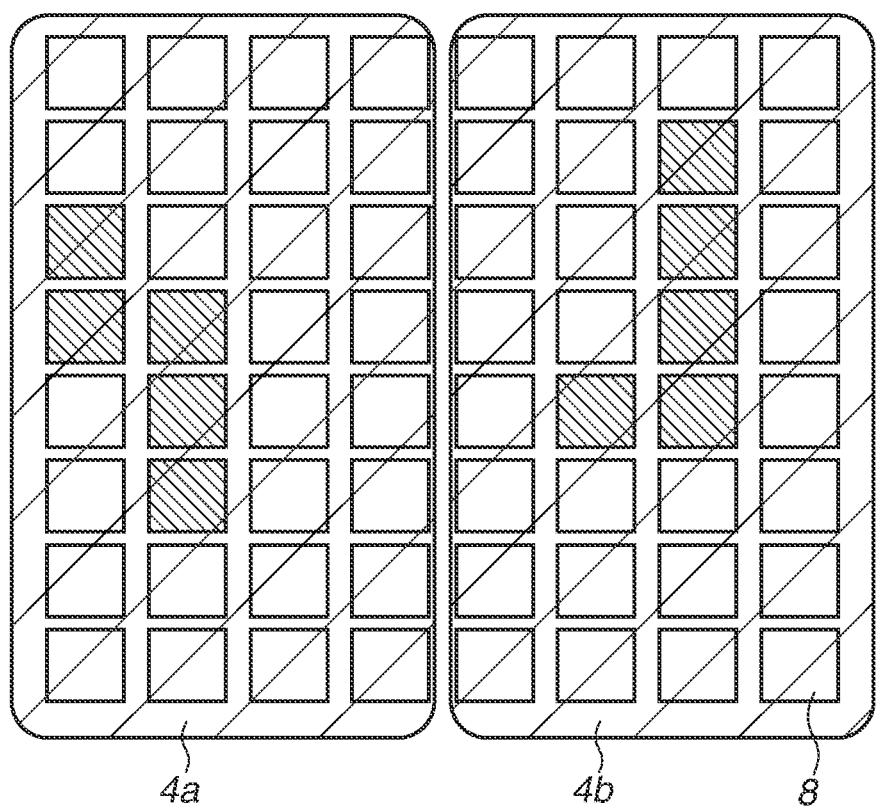
FIG. 2 is a plan view of the X-ray detector according to the first exemplary embodiment.

FIG. 2 is a plan view of the X-ray detector 1 as viewed from the X-ray incident surface. The capacitors 8 in which the charges have been accumulated are illustrated with hatched lines. The hatched capacitors 8 indicate a track of the photoelectrons, and a total charge accumulation amount of the capacitors corresponds to the energy of the incident X-ray. When the charge accumulation amount of each of the capacitors 8 is read through a signal line 10 after the X-ray is measured for a predetermined time, the track of the photoelectrons is imaged and an incident position of the X-ray is specified.

In this case, a charge accumulation time of each of the capacitors 8 cannot be specified from the image. Therefore, an incident time for the X-ray also cannot be specified. However, the time at which the X-ray is incident on the respective front-surface electrodes 4a and 4b is specified through measurement of the times Ta and Tb when the current flows through the respective electrodes 4a and 4b, since the front-surface electrode 4 includes the plurality of front-surface electrodes 4a and 4b, and the front-surface electrodes 4a and 4b are each associated with the corresponding positions of the capacitors 8. Even if two X-rays are incident on the same area, associating the charge accumulation amount of each of the capacitors 8 with a corresponding one of the two X-rays is feasible based on the recorded currents Ia and Ib. Thus, the incident time for each of the X-rays is specified.

The X-ray detector 1 according to the present exemplary embodiment has the following advantages in addition to specification of the incident time for each of the X-rays.
[1] Since the image of only the area on which the X-ray has been incident can be read, it is possible to reduce a reading time period, and to continuously perform measurement on a pixel not subjected to reading during the reading.
[2] Since incidence of the X-ray is detected in real time, it is possible to determine the incident position of the X-ray immediately after the incidence, and to eliminate unnecessary image reading.
[3] Since it can be determined whether an exposure amount has reached a necessary exposure amount by integrating the current flowing through the front-surface electrode 4, it is possible to determine an exposure time period in real time.

Figure 3:
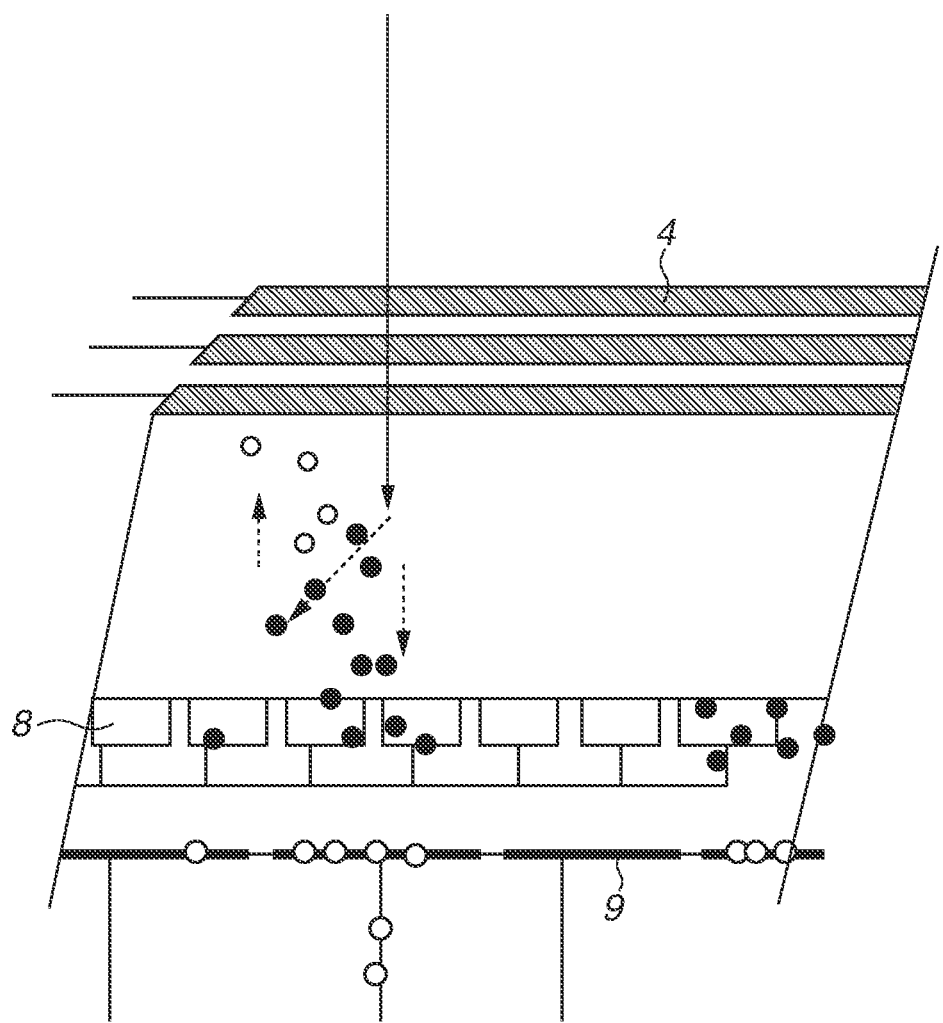
FIG. 3 is a schematic diagram illustrating a configuration of an X-ray detector according to a second exemplary embodiment.

A second exemplary embodiment will be described below. In the present exemplary embodiment, a plurality of stripe shaped front-surface electrodes 4 and a plurality of stripe shaped back-surface electrodes 9 are disposed to be orthogonal to each other in a longitudinal direction, as illustrated in FIG. 3. Incidence of the X-ray on each of intersections between the front-surface electrodes 4 and the back-surface electrodes 9 can be detected by measuring the current flowing through the front-surface electrodes 4 and the current flowing through the back-surface electrodes 9. This enables the specification of the incident position of the X-ray with high accuracy in real time.

Figure 4:
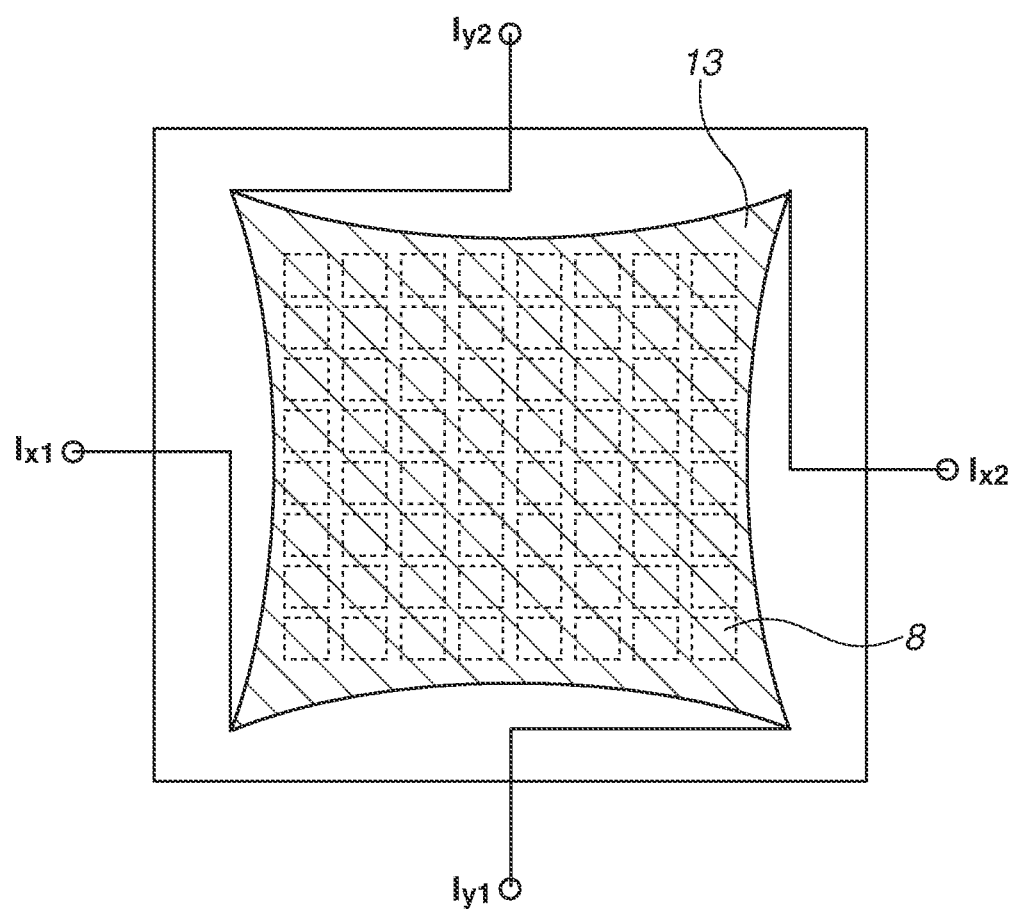
FIG. 4 is a plan view of an X-ray detector according to a third exemplary embodiment.

A third exemplary embodiment will be described below. In the present exemplary embodiment, a resistor layer 13 having four corners is disposed in place of the front-surface electrode 4, as illustrated in FIG. 4. The resistor layer 13 is a position sensitive device (PSD). Currents ($I_{x1}$, $I_{x2}$, $I_{y1}$, and $I_{y2}$) flowing through signal lines connected to the respective corners of the resistor layer 13 vary based on the incident position of the X-ray. The use of this change enables the measurement of the incident position of the X-ray. Although the two-dimensional PSD is illustrated in FIG. 4, terminals may be provided to one of two pairs of opposite sides to form a one-dimensional PSD.

Figure 5:
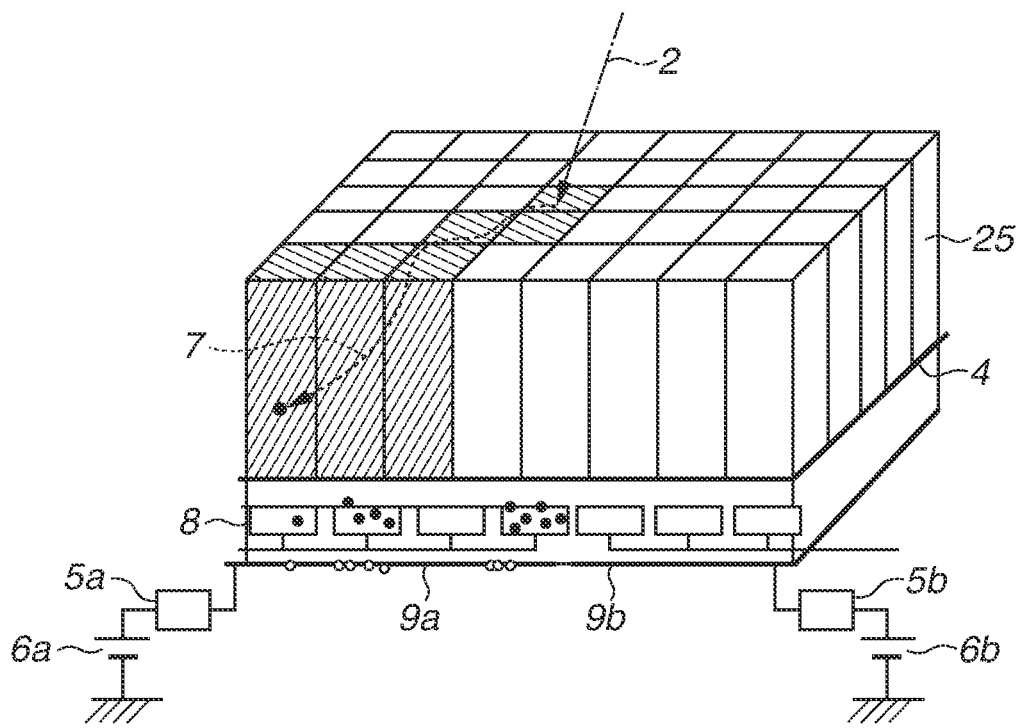
FIG. 5 is a schematic diagram illustrating a configuration of an X-ray detector according to a fourth exemplary embodiment.

A fourth exemplary embodiment will be described below. Although the first to third exemplary embodiments have been described on the premise that the detector is of a direct conversion type, an indirect-conversion detector may be used. In the present exemplary embodiment, as illustrated in FIG. 5, a front-surface electrode 4 that allows visible light to pass therethrough is provided on the surface on which the X-ray 2 is incident, and the X-ray 2 is converted into visible light by a scintillator 25 disposed on a surface of the front-surface electrode 4. As the scintillator 25, a columnar crystal, such as cesium iodide (CsI), or a scintillation fiber is suitable.

Figure 6:
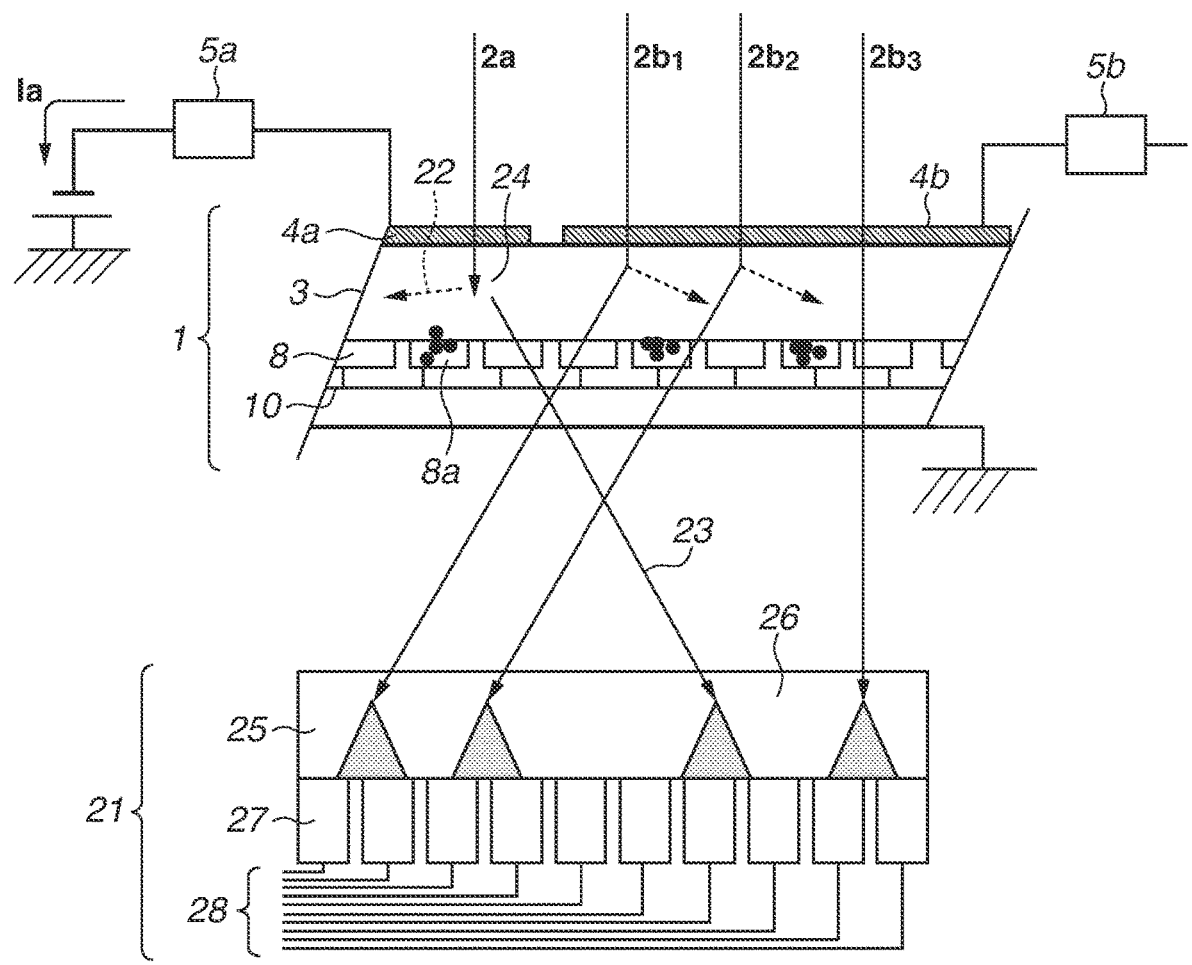
FIG. 6 is a schematic diagram illustrating a configuration of a Compton camera according to a fifth exemplary embodiment.

A fifth exemplary embodiment will be described below. In the present exemplary embodiment, a Compton camera including a radiation detector according to any of the above-described exemplary embodiments is described. As illustrated in FIG. 6, a first detector 1 functions as a scatter that scatters a gamma ray and that measures a scattering position at which the gamma ray is scattered and energy (energy of recoil electrons) lost in the scattering. A second detector 21 measures an absorption position and energy of the scattered gamma ray. The second detector 21 is disposed on the back-surface electrode side of the first detector 1. To calculate an incident direction of the gamma ray with a single Compton scattering, it is necessary to associate measurement data of the first detector 1 and measurement data of the second detector 21 with each other. Thus, the radiation detector according to any of the above-described exemplary embodiments is applied to the first detector 1.

When the gamma ray is incident on the first detector 1 and Compton scattering occurs at a Compton scattering point 24, a recoil electron 22 and a scattered gamma ray 23 are generated. As described above, the recoil electron 22 generates electron holes and electrons, the electrons are accumulated in a capacitor 8a, and the electron holes flow to the ground through an ammeter 5a. The time Ta and the current Ia therefor are recorded. When an image is read after a predetermined time period has elapsed, the energy and the position of the recoil electron 22 are determined from the amount of charges accumulated in the capacitor 8a.

The scattered gamma ray 23 is absorbed in a scintillator 25 of the second detector 21, and scintillator light 26 is emitted. The scintillator light 26 is detected by a photomultiplier tube array 27 disposed on the back side of the scintillator 25. The photomultiplier tube array 27 includes minute photomultiplier tubes arranged in a matrix, and can obtain signals each proportional to the intensity of the scintillator light from signal lines 28 each connected to the corresponding one of the photomultiplier tubes. The absorption position for the scattered gamma ray 23 is detected from these signals with a method such as centroid detection. Since the intensity of the scintillator light is proportional to the intensity of the scattered gamma ray 23, an absorption time, the position, and the energy for the scattered gamma ray 23 are determined through measurement of a current of the signal lines 28.

Figure 7:
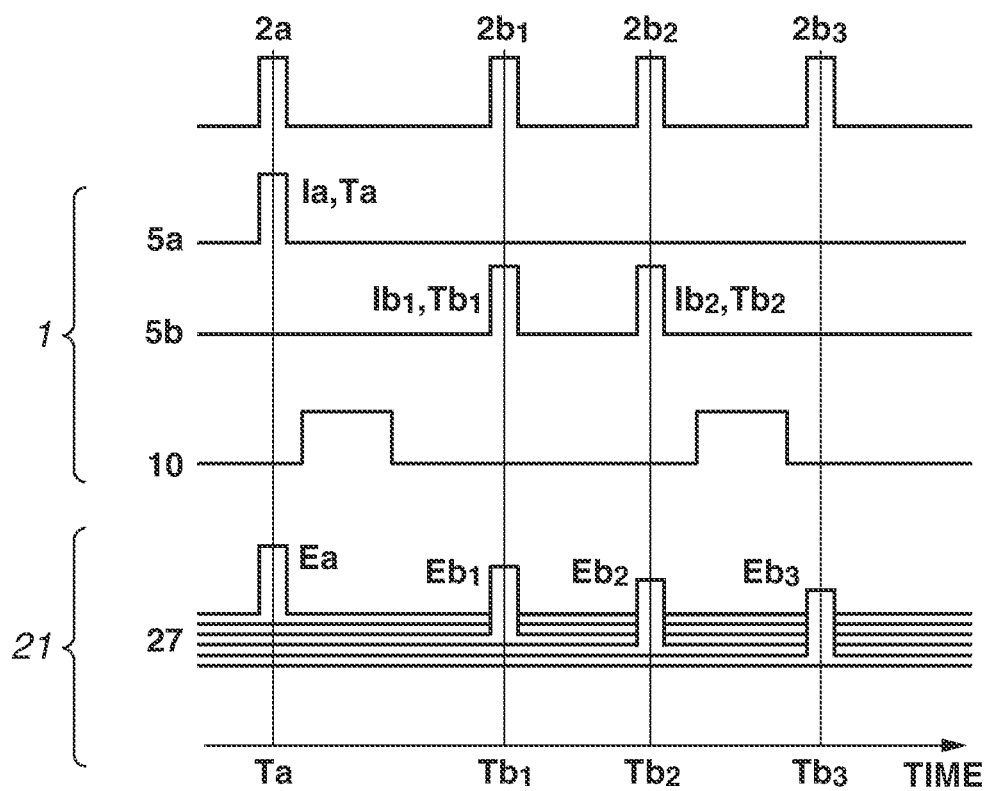
FIG. 7 is a timing chart of operation by the Compton camera according to the fifth exemplary embodiment.

Next, a case will be considered where four gamma rays successively enter the first detector 1, the first three gamma rays each undergoes Compton scattering inside the first detector 1, and the scattered gamma rays are detected by the second detector 21. FIG. 7 is a timing chart of the operation by the first detector 1 and the operation by the second detector 21. Assume that, at the time Ta, a gamma ray 2a incident on the first detector 1 undergoes Compton scattering in the first detector 1, and the scattered gamma ray 23 is incident on the second detector 21 and is detected by the second detector 21. At this time, the current Ia and the time Ta are recorded by the ammeter 5a through a front-surface electrode 4a. In the second detector 21, energy Ea of the scattered gamma ray is recorded at the time Ta. Recording of the track of the recoil electron 22 as an image in the first detector 1 is detected from a signal of the ammeter 5a. Image signals are read through a signal line 10, and accurate energy of the recoil electron and a position of the recoil electron can be determined. It is unnecessary to read the entire area of the image signals, and it is sufficient to read only an area A corresponding to the front-surface electrode 4a. As described above, as for the incident gamma ray 2a, the energy of the recoil electron and the position of the Compton scattering point are detected by the first detector 1, and the energy Ea of the scattered gamma ray and the absorption position of the scattered gamma ray are measured by the second detector 21. This configuration enables the incident direction of the gamma ray 2a to be determined.

Next, a case is considered where two gamma rays $2b_1$ and $2b_2$ are incident on an area B corresponding to a front-surface electrode 4b and image signals of the area B are then read. The respective track of a recoil electron resulting from Compton scattering with each of the two gamma rays $2b_1$ and $2b_2$ is recorded in the image, and the energy of the recoil electrons is determined from the image. In the ammeter 5b, currents $Ib_1$ and $Ib_2$ generated by the energy of the recoil electrons and occurrence times $Tb_1$ and $Tb_2$ thereof are recorded. The occurrence time of the recoil electrons recorded in the image can be determined from the correspondence between the energy of the recoil electrons obtained from the image and the currents in the ammeter. As a result, the recoil electrons and the scattered gamma rays measured by the first detector 1 and the second detector 2 are associated with each of the gamma rays $2b_1$ and $2b_2$. This makes it possible to determine the incident direction of each of the gamma rays.

In a case where an existing radiation detector is used as the first detector, even if the track of the recoil electron has been recorded in the image, it is not possible to specify the gamma ray incident at which of the time Ta and the time $Tb_{1,2}$. This is because there is only the image signal obtained from the signal line 10. Therefore, the correspondence with the data obtained from the second detector 21 is not obtainable.

In the fifth exemplary embodiment, the scattered gamma ray 23 has been described to be photoelectrically absorbed by the scintillator 25; however, the scattered gamma ray 23 may undergo Compton scattering in the scintillator 25. In such a case, the recoil electron and the scattered gamma ray are generated in the scintillator 25, and the energy of the recoil electron is received by the photomultiplier tube and signals obtained therefrom are recorded. The energy of the scattered gamma ray is released to outside. The recoil electron generated when Compton scattering occurs in the first detector 1 may go out of the first detector 1 without stopping inside the first detector 1. In such a case, the incident direction of the gamma ray cannot be accurately determined because the measured energy of the recoil electron or the scattered gamma ray is inaccurate. Thus, in a case where a sum of energy $E_e$ of the recoil electron and energy $E_g$ of the scattered gamma ray obtained by the first detector 1 and the second detector 21 is not equal to the energy $E_0$ of the incident gamma ray within a measurement error range, namely, in a case where the following expression (1) is established, the data is discarded to maintain high detection accuracy of the incident gamma ray:

$$|E_0-(E_e+E_g)|>\text{measurement error.} \quad (1)$$

A description will be provided of a method for determining, from the measurement data of the first detector 1 and the second detector 21, whether to discard the data even in a case where the energy of the incident gamma ray is unknown. In FIG. 6, it is assumed that, among the four incident gamma rays, a fourth gamma ray $2b_3$ does not undergoes Compton scattering in the first detector 1, and is detected by the second detector 21 without losing its energy. In a case where a gamma ray undergoes Compton scattering in the first detector 1, the energy of the scattered gamma ray has a wide distribution but does not have a sharp peak. In contrast, in a case where the gamma ray is directly absorbed by the scintillator without Compton scattering in the first detector 1, the distribution of energy $Eb_3$ of the gamma ray obtained by the second detector 21 is determined based on energy resolution of the second detector 21 and has a peak. Thus, even if the energy $E_0$ of the incident gamma ray is not known in advance, the energy $E_0$ can be estimated, which makes it possible to discard the data pair based on the expression (1).

Other Exemplary Embodiments (1) Variations of the first to fourth exemplary embodiments include the following embodiments.

[1] When a current flowing through an electrode or a voltage applied to an electrode exceeds a predetermined value, the exposure is terminated or the two-dimensional image is read. As a result, in a case of a signal having a value equal to or lower than a predetermined value, a two-dimensional image can be read when the number of recoil electrons reaches a predetermined value, and it is possible to avoid unnecessary reading. Further, it is possible to ignore a signal having a value equal to or lower than a noise level.

[2] It is sufficient to measure a current with the front-surface electrode 4 not being divided, and the incident time for respective X-rays can be determined from the current Ia and the amount of charges accumulated in capacitors.

[3] The current flowing through the back-surface electrode 9 and the time thereof may be measured in place of the front-surface electrode 4.

[4] The voltage may be measured to measure a current flowing through an electrode. Further, in a case where the image is read after incidence of a predetermined X-ray dosage, the voltage values generated by respective X-rays may be integrated and the image may be read after the integrated voltage value reaches a predetermined voltage value as with a preamplifier of the radiation detector, since the energy of each of the X-rays is small.

(2) In a case where the energy of the photoelectrons is high in the first exemplary embodiment, the photoelectrons may not stop only with a single X-ray detector 1 and leave from the back-surface of the X-ray detector 1. As a result, the energy of the photoelectrons cannot be determined accurately. In such a case, when multiple X-ray detectors 1 are stacked, the photoelectrons left from a first X-ray detector 1 enter a next X-ray detector 1, lose energy, and then stop. It can be regarded that the electrons and the electron holes are generated at the same time among these X-ray detectors 1 because the velocity of the photoelectrons is close to the velocity of light. Thus, the energy of the photoelectrons is accurately determined by summing the energy of the photoelectrons that is generated at the same time and is recorded in the ammeter in each of the X-ray detectors 1 or the energy of the photoelectrons calculated from the image in each of the X-ray detectors 1.

(3) Although the combination of the scintillator and the photomultiplier tube array is described as the second detector 21 in the fifth exemplary embodiment, the radiation detector according to any of the exemplary embodiments may be used.

In the exemplary embodiments, the incidence of the radiation is detected in real time, thus enabling the acquisition of the image signal at the same time as the incidence of the radiation. As a result, it is possible to suppress background and the noise of the image signal, and to eliminate acquisition of the unnecessary image signal, thus reducing the number of transfer times of the image signal. In addition, since the incident area of the radiation is detected, the image signal amount is reduced, resulting in reduction in the transfer time period. Moreover, since it is detected that an exposure amount reaches a necessary exposure amount while performing exposure, for incident light with low intensity, the exposure amount can be appropriately managed.

In addition, application of an exemplary embodiment to a Compton camera enables specification of the incident direction of a gamma ray with high sensitivity and high accuracy.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-138768, which was filed on Jul. 24, 2018 and which is hereby incorporated by reference herein in its entirety.

What is claimed is:

1. A radiation detector including a semiconductor substrate and electrodes disposed on both sides of the semiconductor substrate, the radiation detector comprising:
a plurality of charge accumulation units disposed inside the semiconductor substrate and each configured to accumulate a charge generated by radiation incident on the semiconductor substrate,
wherein charges accumulated in the plurality of charge accumulation units are readable to outside through at least one of signal lines so that a track of a photoelectron which generates the charges is specified,
wherein the electrodes disposed on the both sides of the semiconductor substrate include a plurality of front-surface electrodes disposed on a radiation incident side of the semiconductor substrate and a back-surface electrode disposed on a side opposite to the radiation incident side of the semiconductor substrate,
wherein each of the plurality of front-surface electrodes is connected to an ammeter,
wherein the plurality of front-surface electrodes and the plurality of charge accumulation units are associated with one another in position, and
wherein a time when the radiation is incident on each of the plurality of front-surface electrodes is specified by a time when a current flows through each of the plurality of front-surface electrodes being measured.

2. The radiation detector according to claim 1,
wherein a plurality of the back-surface electrodes is disposed, and
wherein the plurality of back-surface electrodes is arranged in such a manner that a longitudinal direction of the plurality of back-surface electrodes is orthogonal to a longitudinal direction of the plurality of front-surface electrodes.

3. The radiation detector according to claim 1,
wherein a scintillator is disposed on a surface of one of the electrodes, and
wherein the radiation is visible light.

4. The radiation detector according to claim 1, wherein exposure is terminated when a current flowing through the electrodes or the voltage applied to the electrodes exceeds a predetermined value.

5. A radiation detector including a semiconductor substrate and electrodes disposed on both sides of the semiconductor substrate, the radiation detector comprising:
a plurality of charge accumulation units disposed inside the semiconductor substrate and each configured to accumulate a charge generated by radiation incident on the semiconductor substrate,
wherein charges accumulated in the plurality of charge accumulation units are readable to outside through at least one of the electrodes, and
wherein one of the electrodes includes a resistor layer having a shape including four corners, and at least two corners opposed to each other out of the four corners are each connected to a signal line.

6. A Compton camera, comprising:
a radiation detector including a semiconductor substrate and electrodes disposed on both sides of the semiconductor substrate, the radiation detector comprising:
a plurality of charge accumulation units disposed inside the semiconductor substrate and each configured to accumulate a charge generated by radiation incident on the semiconductor substrate,
wherein charges accumulated in the plurality of charge accumulation units are readable to outside through at least one of signal lines so that the track of a recoil electron which generates the charges is specified,
wherein the electrodes disposed on the both sides of the semiconductor substrate include a plurality of front-surface electrodes disposed on a radiation incident side of the semiconductor substrate and a back-surface electrode disposed on a side opposite to the radiation incident side of the semiconductor substrate,
wherein each of the plurality of front-surface electrodes is connected to an ammeter, wherein the plurality of front-surface electrodes and the plurality of charge accumulation units are associated with one another in position, and wherein a time when the radiation is incident on each of the plurality of front-surface electrodes is specified by a time when a current flows through each of the plurality of front-surface electrodes being measured, and a second radiation detector disposed on a side opposite to a radiation incident side of the radiation detector, wherein the radiation detector detects energy of the recoil electron generated by Compton scattering with incident radiation, wherein the second radiation detector detects energy of a scattered gamma ray scattered by the Compton scattering, and wherein an incident direction of the incident radiation is specified from the energy of the recoil electron and the energy of the scattered gamma ray to form an image.

7. The Compton camera according to claim 6, wherein exposure is terminated when a current flowing through the electrodes or the voltage applied to the electrodes exceeds a predetermined value.

8. A Compton camera comprising:

a radiation detector including a semiconductor substrate and electrodes disposed on both sides of the semiconductor substrate, the radiation detector comprising:

a plurality of charge accumulation units disposed inside the semiconductor substrate and each configured to accumulate a charge generated by radiation incident on the semiconductor substrate, wherein charges accumulated in the plurality of charge accumulation units are readable to outside through at least one of the electrodes; and a second radiation detector disposed on a side opposite to a radiation incident side of the radiation detector, wherein the radiation detector detects energy of a recoil electron generated by Compton scattering with incident radiation, wherein the second radiation detector detects energy of a scattered gamma ray scattered by the Compton scattering, wherein an incident direction of the incident radiation is specified from the energy of the recoil electron and the energy of the scattered gamma ray to form an image, and wherein data obtained from the radiation detector and data obtained from the second radiation detector are discarded when, for an estimated measurement error, the following expression is satisfied:

$|E_0-(E_e+E_g)|>$measurement error, where $E_e$ is the energy of the recoil electron, $E_g$ is the energy of the scattered gamma ray, and $E_0$ is energy of the incident gamma ray.

9. A radiation detector including a semiconductor substrate and electrodes disposed on both sides of the semiconductor substrate, the radiation detector comprising:

a plurality of charge accumulation units disposed inside the semiconductor substrate and each configured to accumulate a charge generated by radiation incident on the semiconductor substrate, wherein charges accumulated in the plurality of charge accumulation units are readable to outside through at least one of signal lines so that a track of a photoelectron which generates the charges is specified, wherein the electrodes disposed on the both sides of the semiconductor substrate include a front-surface electrode disposed on a radiation incident side of the semiconductor substrate and a plurality of back-surface electrodes disposed on a side opposite to the radiation incident side of the semiconductor substrate, wherein each of the plurality of back-surface electrodes is connected to an ammeter, wherein the plurality of back-surface electrodes and the plurality of charge accumulation units are associated with one another in position, and wherein a time when the radiation is incident on each of the plurality of back-surface electrodes is specified by a time when a current flows through each of the plurality of back-surface electrodes being measured.

10. The radiation detector according to claim 9, wherein a scintillator is disposed on a surface of one of the electrodes, and wherein the radiation is visible light.

11. A Compton camera, comprising:

a radiation detector including a semiconductor substrate and electrodes disposed on both sides of the semiconductor substrate, the radiation detector comprising:

a plurality of charge accumulation units disposed inside the semiconductor substrate and each configured to accumulate a charge generated by radiation incident on the semiconductor substrate, wherein charges accumulated in the plurality of charge accumulation units are readable to outside through at least one of signal lines so that the track of a recoil electron which generates the charges is specified, wherein the electrodes disposed on the both sides of the semiconductor substrate include a front-surface electrode disposed on a radiation incident side of the semiconductor substrate and a plurality of back-surface electrodes disposed on a side opposite to the radiation incident side of the semiconductor substrate, wherein each of the plurality of back-surface electrodes is connected to an ammeter, wherein the plurality of back-surface electrodes and the plurality of charge accumulation units are associated with one another in position, and wherein a time when the radiation is incident on each of the plurality of back-surface electrodes is specified by a time when a current flows through each of the plurality of back-surface electrodes being measured, and a second radiation detector disposed on a side opposite to a radiation incident side of the radiation detector, wherein the radiation detector detects energy of the recoil electron generated by Compton scattering with incident radiation, wherein the second radiation detector detects energy of a scattered gamma ray scattered by the Compton scattering, and wherein an incident direction of the incident radiation is specified from the energy of the recoil electron and the energy of the scattered gamma ray to form an image.

* * * * *